United States Patent
Kozat et al.

(10) Patent No.: US 10,896,456 B2
(45) Date of Patent: *Jan. 19, 2021

(54) METHOD AND APPARATUS FOR PROXIMITY SERVICE DISCOVERY

(71) Applicant: NTT DOCOMO, INC., Tokyo (JP)

(72) Inventors: Ulas C. Kozat, Palo Alto, CA (US); Fujio Watanabe, Palo Alto, CA (US); Danh Le, Palo Alto, CA (US); Erdi Olmezogullari, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 15/969,334

(22) Filed: May 2, 2018

(65) Prior Publication Data

US 2018/0315109 A1 Nov. 1, 2018

Related U.S. Application Data

(62) Division of application No. 14/977,154, filed on Dec. 21, 2015, now Pat. No. 10,332,180.

(Continued)

(51) Int. Cl.
*G06Q 30/00* (2012.01)
*G06Q 30/06* (2012.01)
(Continued)

(52) U.S. Cl.
CPC ........ *G06Q 30/0623* (2013.01); *H04W 4/023* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 9,256,890 B1* | 2/2016 | Schmidt | G06Q 30/0261 |
| 2015/0229990 A1* | 8/2015 | Garza | H04N 21/4126 |
| | | | 725/12 |
| 2016/0088586 A1* | 3/2016 | Stephens | H04W 4/06 |
| | | | 455/412.2 |

FOREIGN PATENT DOCUMENTS

| | | |
|---|---|---|
| WO | 2013126747 | 8/2013 |
| WO | 2013163595 | 10/2013 |
| WO | 2014187277 | 11/2014 |

OTHER PUBLICATIONS

Japanese Office Action for Application No. 2015-252243 dated Jun. 11, 2019, 7 pages.

* cited by examiner

*Primary Examiner* — Mila Airapetian
(74) *Attorney, Agent, or Firm* — Womble Bond Dickinson (US) LLP

(57) ABSTRACT

A method and apparatus for proximity service discovery are disclosed. In one embodiment, the method comprises providing one or more expressions from a market server to at least one wireless broadcasting device for broadcasting over one or more wireless channels, each of the one or more expressions related to different marketplace items, receiving, at the market server, one or more requests from one or more wireless devices for information to identify items being offered in marketplace that match items the one or more wireless devices are attempting to obtain, sending expressions to at least one or more wireless devices associated for matching the relevant broadcast signals associated with items the one or more wireless devices are attempting to obtain, and providing, by the marketing server, data notification channels for direct device-to-device data notification over at least one wireless channel to facilitate information exchange between the at least one wireless (Continued)

broadcasting device and the one or more wireless devices attempting to obtain items being offered by the at least one wireless broadcasting device.

20 Claims, 13 Drawing Sheets

Related U.S. Application Data

(60) Provisional application No. 62/253,051, filed on Nov. 9, 2015, provisional application No. 62/106,528, filed on Jan. 22, 2015, provisional application No. 62/096,356, filed on Dec. 23, 2014.

(51) Int. Cl.
*H04W 4/02* (2018.01)
*H04W 4/06* (2009.01)

| RSSI | Signal Strength | Binary |
|---|---|---|
| > -70 dBm | Excellent | 0x100 |
| -70 dBm to -85 dBm | Good | 0x011 |
| -86 dBm to -100 dBm | Fair | 0x010 |
| < -100 dBm | Poor | 0x001 |
| -110 dBm | No Signal | 0x000 |

METHOD AND APPARATUS FOR PROXIMITY SERVICE DISCOVERY

PRIORITY

The present patent application claims priority to and incorporates by reference the corresponding provisional patent application Ser. No. 62/096,356, titled, "A Method and Apparatus for LTE-D Based Proximity Service Discovery and Data Notification," filed on Dec. 23, 2014; provisional patent application No. 62/106,528, titled, "A Method and Apparatus for Managing the Placement of Broadcast Signals for Proximity-based Service Discovery," filed on Jan. 22, 2015; and provisional patent application Ser. No. 62/253,051, titled, "A Method and Apparatus for an Instant Customizable Service Delivery System Based on Spatiotemporal Mobile Network," filed on Nov. 9, 2015.

FIELD OF THE INVENTION

Embodiments of the present invention are related to the field of proximity-based service discovery; more particularly, embodiments of the present invention are related to proximity-based service discovery marketplace using primary and auxiliary expressions.

BACKGROUND OF THE INVENTION

Proximity services exist in various forms. In some current prevalent proximity-based services, the devices that broadcast information for a particular service belong to the provider of that service. For instance, a department store that wants to send advertisements about on-sale items must purchase an access point or a subscriber unit capable of sending information assigned to the department store. This means that a business or individual has only coverage within the immediate range of the devices they own and operate.

A most notable proximity service is referred to as geofencing, where services can specify a certain geographical area and ask the proximity service provider to notify them when a client enters that specified area. The specified area can be fuzzy (e.g., an area covered by a particular WiFi service set identifier (SSID) or cellular base station) or more explicit by defining explicit geographical boundaries and using a global position system (GPS) or other localization techniques. Another important class of proximity service solutions utilizes relative proximity between pairs of wireless devices, where one, both or none of the devices might be mobile. Implicit in all these services, the discovery is opportunistic, i.e., clients discovering the services should be within the radio range (e.g., <<500 meters) of the service being advertised.

Long Term Evolution (LTE)-Direct, hereinafter referred to as LTE-D, provides a radio modem based service discovery where applications are assigned application specific expressions (e.g., 128 bits) to broadcast their services over dedicated LTE uplink resources allocated by a mobile operator. Once an application publishes one or more expressions, these expressions are pushed down to the LTE-D chip in a wireless user device, or user equipment (UE). When an application subscribes to an expression, it defines which bits of the expression should be used and to what values they need to be equal (i.e., a bit-mask and a match value). The bit-mask and match value are pushed down to the LTE-D chip of a user device. LTE-D chip and LTE radio of the user device periodically wake up, broadcast any published expressions on the user device using some of the LTE uplink resources allocated for service discovery and in the remaining resources for service discovery, they listen to the expressions broadcasted by other devices to identify any matches to the subscribed expressions. When the LTE-D chip in a user device matches any expression, it notifies the application subscribed to that expression on the same device. Upon receiving the notification, the application executes its application logic. Since the operating system and application can be asleep during expression broadcasting and receiving, the system can achieve high energy efficiency.

LTE-D provides a publish-subscribe mechanism through which expressions broadcasted and/or received over a subset of LTE uplink resources for device-to-device (D2D) service discovery. LTE-D also provides mechanisms for receiving static service data from a remote server upon a service is discovered. Qualcomm provides Expression Name Servers (ENS) that handle registration of blocks of expressions by operators and public applications. However, ENS does not explicitly specify how these blocks of expressions are managed and/or handled by specific operators and applications.

SUMMARY

A method and apparatus for proximity service discovery are disclosed. In one embodiment, the method comprises providing one or more expressions from a market server to at least one wireless broadcasting device for broadcasting over one or more wireless channels, each of the one or more expressions related to different marketplace items, receiving, at the market server, one or more requests from one or more wireless devices for information to identify items being offered in marketplace that match items the one or more wireless devices are attempting to obtain, sending expressions to at least one or more wireless devices associated for matching the relevant broadcast signals associated with items the one or more wireless devices are attempting to obtain, and providing, by the marketing server, data notification channels for direct device-to-device data notification over at least one wireless channel to facilitate information exchange between the at least one wireless broadcasting device and the one or more wireless devices attempting to obtain items being offered by the at least one wireless broadcasting device.

BRIEF DESCRIPTION OF DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
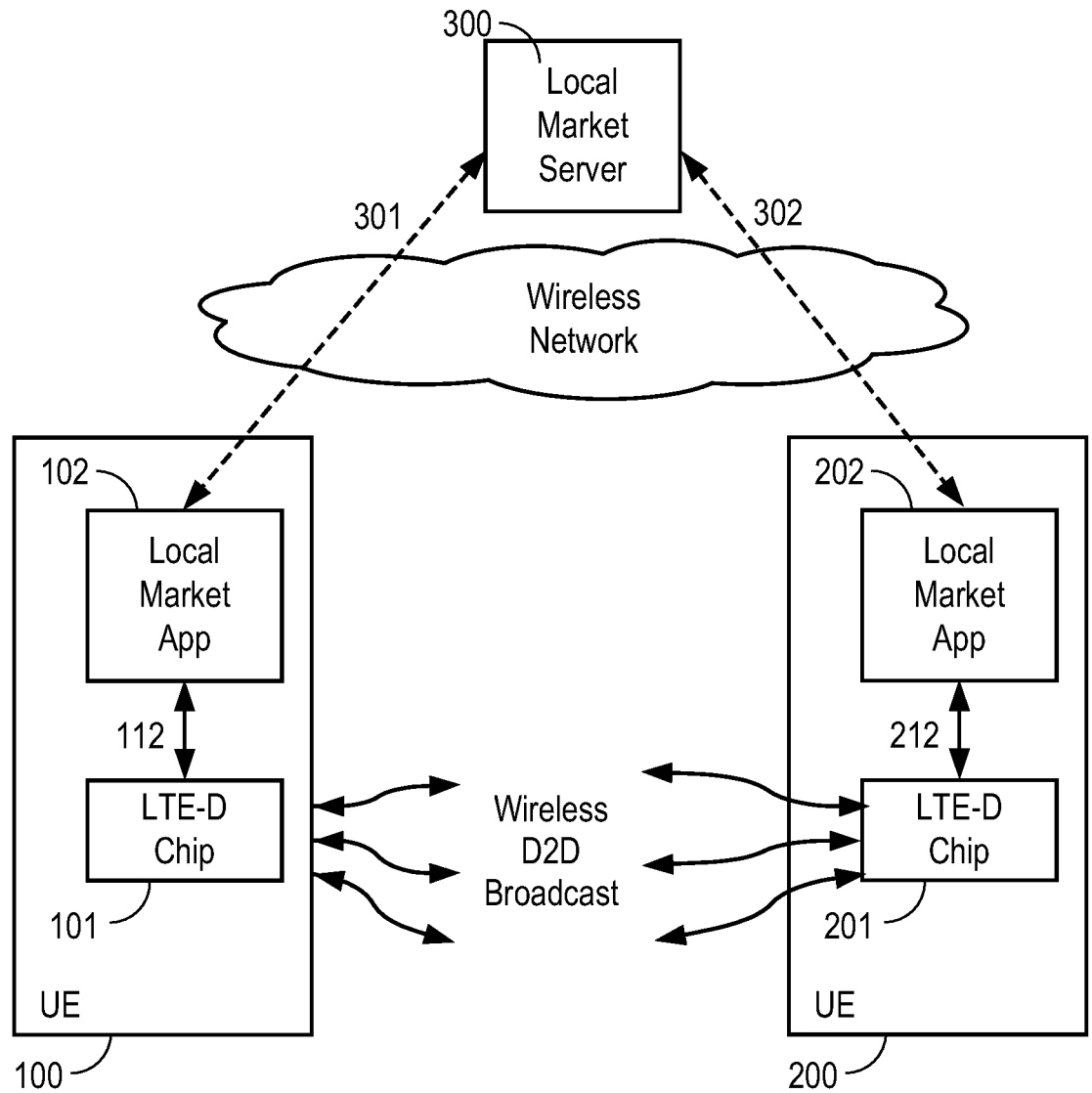
FIG. 1A is a block diagram of one embodiment of a system architecture.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Proximity-based services provide a new frontier for operators to generate new revenue sources. Unlike current location based services that provides location and mobility information of (aggregate or individual) users to fetch services from the cloud, proximity-based services let producers and consumers within walking distance of each other find each other and engage in a social, philanthropic or commercial activity. Creating a market space for such a paradigm can combine virtual and physical shopping into a better experience than having only one or the other.

In one embodiment of a proximity-based service discovery, a physical device transmits expressions (e.g., beacons) in the form of modulated radio waves over the wireless medium using one or more wireless device to device technologies including, for example, Bluetooth, LTE-D and WiFi. The transmitting device can be a standalone device that is part of the fixed infrastructure. The transmitting device can also be a user equipment (UE) such as, for example, a smart phone, tablet, laptop computer, etc., that is also communicably coupled to other devices and servers through a wireless access network. In one embodiment, the receiver devices comprise other UEs subscribed to one or more proximity services, each of which are assigned one or more expressions. In one embodiment, subscribing to a proximity service means that the device periodically listens to the expressions broadcasted in the vicinity and notifies the subscribing applications about matched signals (if any of the expressions matches to the subscribed proximity service).

In one embodiment, regardless of the device type, the transmitting and receiving devices include operating systems and radio interfaces, and the service discovery function for proximity services is handled with the operating system and/or radio interface. In one embodiment, applications using the proximity services remain typically idle pending discovery notifications from an already running service discovery function in the operating system and/or the radio interface that have already been instructed as to what expressions should be broadcasted or listened for (e.g., using an application programming interface (API)). Such service discovery functions are then able to transmit expressions published by applications (if existing) and listens for expressions subscribed to by any application (if existing) on the physical device.

In one embodiment, a local market framework uses proximity service discovery authentication, where users join the local market by installing a local market application on their respective user devices. A user utilizing the application can be in the role of "buyer" who is interested in finding goods and services being sold, shared, donated, leased by other nearby users. A user utilizing the application can be in the role of "seller" who advertises goods and services they are selling, sharing, donating, leasing. In one embodiment, the local market framework uses physical devices that can broadcast expressions (e.g., beacons) using one or more technologies (e.g., Bluetooth, LTE-D, WiFi, etc.) to provide a platform for proximity-based service discovery (PSD).

In one embodiment, the market framework allows users (e.g., individuals, charities, businesses, schools, etc.) to automatically join and leave local markets as they move around. Embodiments of the invention include an apparatus for establishing proximity-based local markets where anyone or organization can provide goods and services to anyone or organization within the wireless communication range (e.g., for LTE-D, the range is up to 500 meters) as both the providers and potential consumers move around.

The market framework hosts a backend server (e.g., a remotely located server) that manages the data and expressions being used by the market users. In one embodiment, the backend server comprises:

(1) a data-store handler that processes data related to published or subscribed expressions. In various embodiments, the data-store handler utilizes a relational or non-relational database. In one embodiment, a key-value store is used, and the whole or different parts of each assigned expression are used as keys and data that correspond to these (parts of the) expressions are used as the values;

(2) a publication manager that receives publication requests from the installed instances of local market application (LMA) and in return assigns expressions to LMAs for advertising services and sending data notifications over the LTE-D channel;

(3) a subscription manager that receives subscription requests from instances of LMAs and in return assigns information (e.g., bit-masks) for LMAs that reflect user preferences and interests in the expression matching hardware and software on the devices where LMA instances are installed; and (4) a communication channel (e.g., transport protocol and port) for LMA instances to push and pull data to and from memory (e.g., the key-value store).

The techniques described herein support notification channels over LTE-D that accompany the goods and services being broadcasted, which might have dynamic data that is fetched to the user devices. Since the notification channel utilizes LTE-D, unlike the application layer notification channels that keep persistent connectivity with cloud servers, market applications that utilize these techniques can be put to sleep until a data update occurs.

In one embodiment, the local market framework uses primary expressions and a set of auxiliary expressions. In one embodiment, these expressions are beacons. In one embodiment, both types of expressions are used as notification channels. In one embodiment, while the primary expressions are used to advertise goods and services generally, the auxiliary expression are used to specify details about the specific features of the goods and services and parameters regarding a transaction regarding the goods and services. In one embodiment, an expression manager (which in one embodiment is part of a server) assigns these primary and auxiliary expressions on a per-demand basis to different instances of local market applications running on different user devices when the applications dynamically update the data about goods and services published by them and want to utilize LTE-D as a notification channel. In one embodiment, the auxiliary expressions are assigned to primary expressions and both the publishers and subscribers of these primary expressions are notified about the auxiliary expressions to use for data notifications. A number of different options of how the publishers and subscribers use auxiliary expressions are described herein.

An Example of a Discovery Architecture

FIG. 1A is a block diagram of one embodiment of a system architecture with two user equipments (UEs) 100 and 200 within discovery range of each other. Note that the system generally has more than two UEs. Referring to FIG. 1A, in one embodiment, each UE has a sub-system for proximity services (e.g., LTE-D) powered and operated as a standalone component (and the rest of the UE components can put into sleep). In one embodiment, the subsystem comprises an LTE-D chip, such as LTE-D chips 101 and 201 of UEs 100 and 200, respectively.

An application running on each UE communicates with its proximity service components. For example, in UE 100, local market application (LMA) 102 communicates with LTE-D chip 101 via interface 112, and in UE 200, LMA 202 communicates with LTE-D chip 201 via interface 212. In one embodiment, this communication occurs through an application programmer interface (API) and different instances of the application are installed and run on different UEs.

A logically centralized entity (e.g., one or more servers) referred to herein as a Local Market Server (LMS) 300 is located in the backend cloud or other remote storage location to provide services to instances of LMAs. LMS 300 may be referred to as a proximity server. In one embodiment, each instance of market application supports an interface (e.g., LMA 102 uses interface 301 and LMA 202 uses interface 302 in FIG. 1) with LMS 300. In one embodiment, such an interface is implemented as a native transport socket using TCP, SSH, or any other standard transport protocol or can be implemented over HTTP/HTTPS as a RESTful web interface. In one embodiment, such an interface occurs over a wireless network.

Figure 1B:
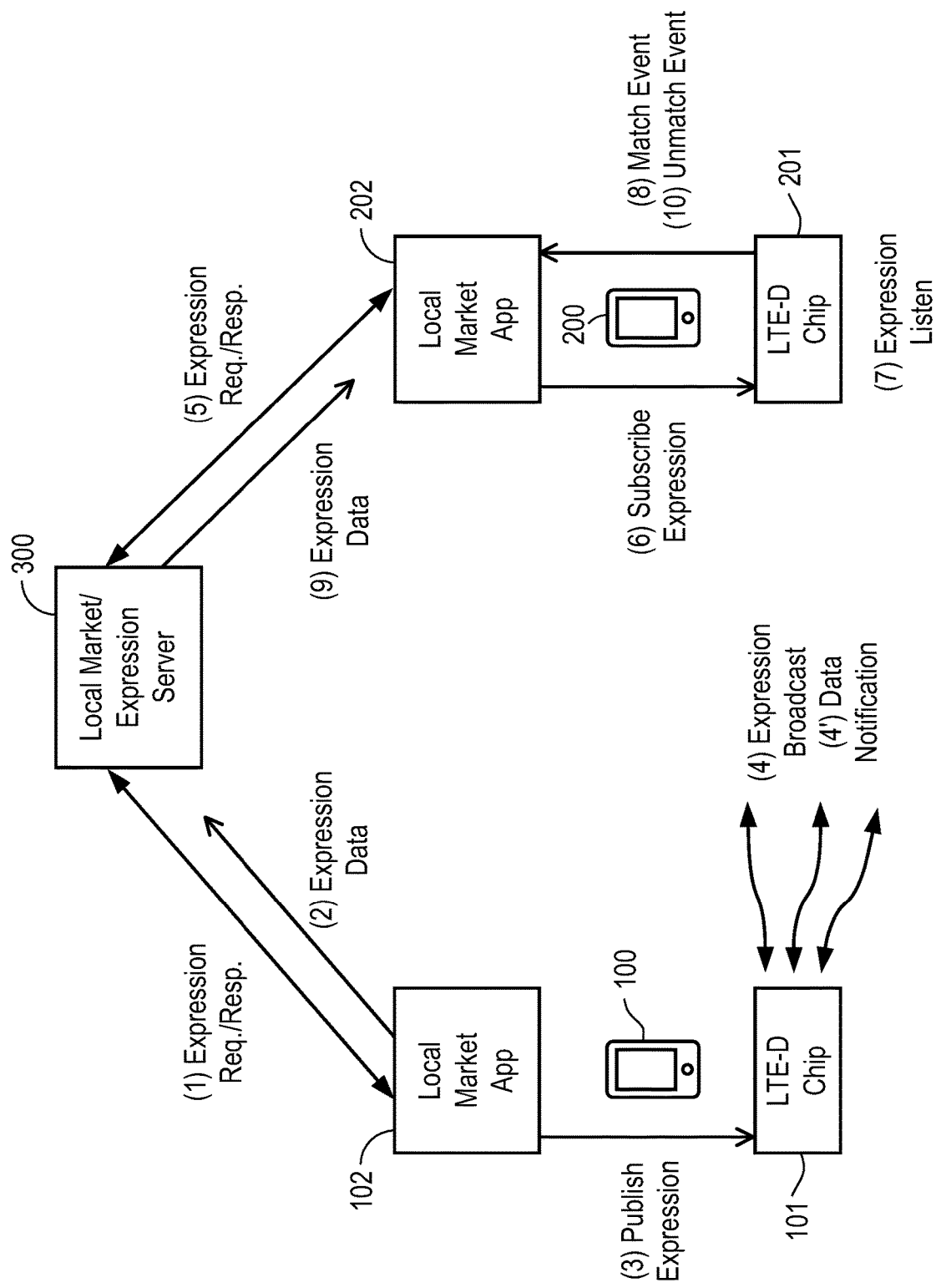
FIG. 1B is a data flow diagram illustrating the operations of one embodiment of the proximity based service discovery based marketplace of FIG. 1A.

FIG. 1B is a data flow diagram illustrating the operations of one embodiment of the proximity based service discovery based marketplace of FIG. 1A. Referring to FIG. 1B, The user of UE 100 desires to sell a good and service and causes its LMA 102 to request an expression, or set thereof, from LMS 300, which acts as an expression server to control the use of expressions (e.g., primary and auxiliary expressions). Along with the request, LMA 102 provides data for use in the expressions that allow LMS 300 to create expressions that can be used in the marketplace to identify the type of goods and/or service along with information (e.g., UE and/or transaction identifiers) to enable marketplace participants to be able to complete a transaction in the marketplace.

LMS 300 responds to LMA 102 with a grant or denial of the request. Assuming a grant of the request by LMS 300, LMA 102 provides the expression(s) to LMA 102 for use in the marketplace for the type of good and/or service the user of UE 100 wants to offer. In response, LMA 102 instructs LTE-D chip 101 of UE 100 to publish the primary expression and provide data notification (e.g., auxiliary expressions).

During this time, the user of UE 200 desires to subscribe to receive offers for the same type of good and/or service being offered by UE 100. Therefore, LMA 202 of UE 200 sends a request to LMS 300 to receive information to enable UE 200 to receive information related to the goods/services it desires. In response to the request, LMS 300 provides expression data to LMA 202 that enables it to determine with an offer for the desired good/service has been broadcast. LMA 200 forwards the expression data for the subscribed good/service to LTE-D chip 201 which listens for the expression being broadcast by other UEs. Upon determining that a match occurs between the expression data it received from LMA 202 and an expression being broadcast by another UE (UE 100 in this example), LTE-D chip 201 notifies LMA 202 of the match event. In response to being notified of the match event, LMA 202 requests more information from LMS 300 (or another remotely located server using information in a primary expression) to enable it to complete the transaction. LMA 300 provides the additional expression data to LMA 202 and LMA 200 uses the data to complete the transaction with the user of UE 100. In one embodiment, the expression data comprises one or more auxiliary expressions. If the unmatched event is received at LTE-D chip 201, the unmatched event will be dumped in LTE-D chip 201 or even at a higher layer at local market application 202.

Figure 2:
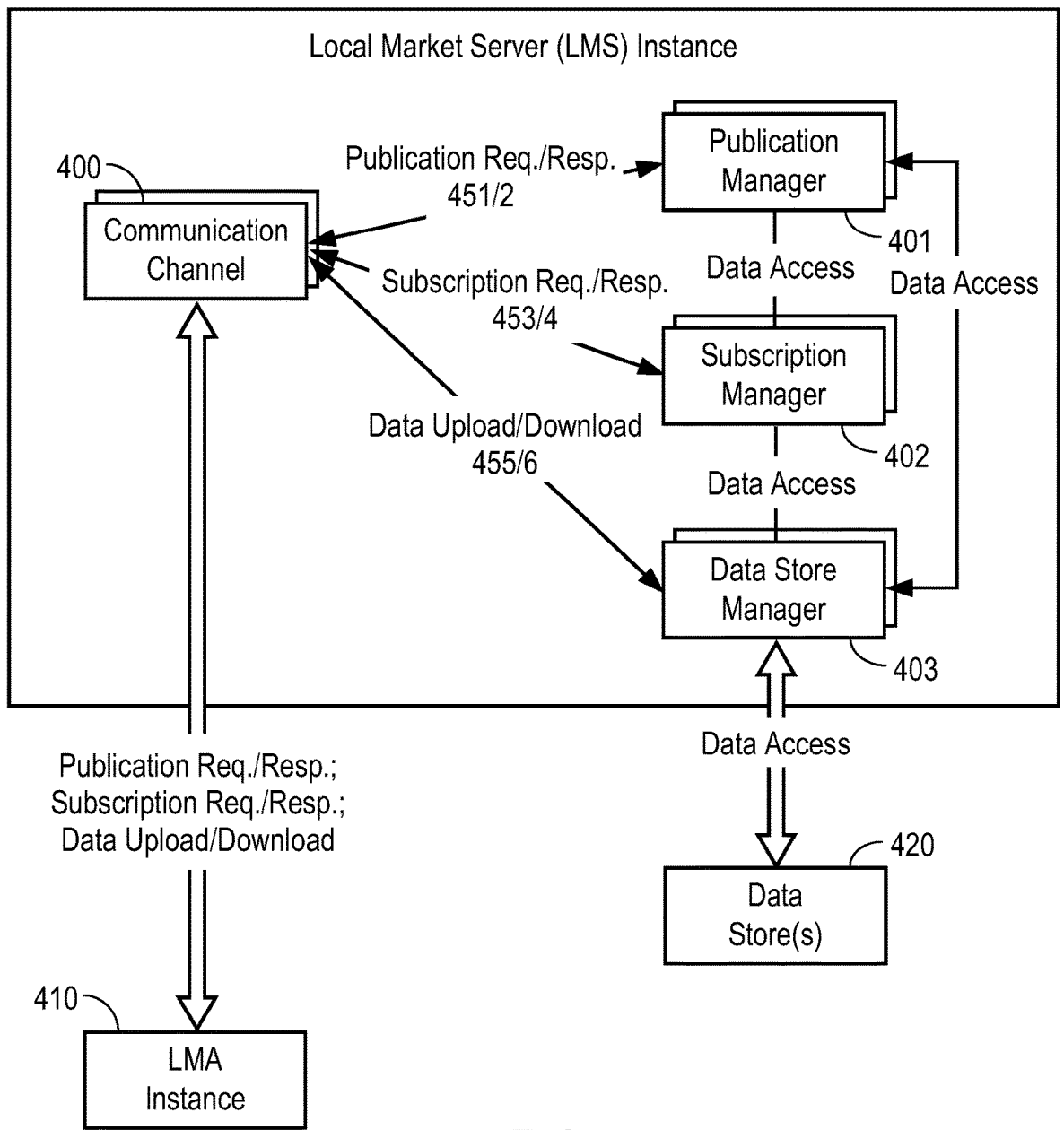
FIG. 2 is a block diagram of one embodiment of an LMS.

FIG. 2 is a block diagram of one embodiment of a LMS (e.g., LMS 300) and its components. Referring to FIG. 2, communication channel 400 receives messages from LMA (e.g., LMA 410) and generates response to the LMA to those messages. In one embodiment, the messages comprise Publication Request, Publication Response, Subscription Request, Subscription Response, Data Upload and Data Download messages. When a publication request message is received from LMA instance the LMS instance passes the message to publication manager 401. In response, publication manager 401 assigns an expression based on an expression template suitable for the published service or good. In one embodiment, the expression template is fixed for a given version of LMA. In another embodiment, the expression template is dynamically regenerated by publication manager 401.

Figure 3:
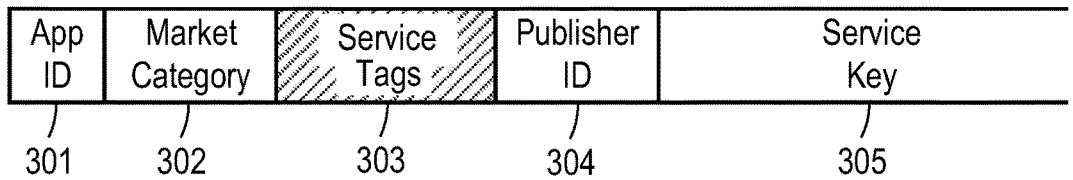
FIG. 3 illustrates one embodiment of an expression template.

FIG. 3 illustrates one embodiment of an expression template. Referring to FIG. 3, in one embodiment, application identifier (ID) 301 is the same across all LMA instances in a local marketplace that uniquely points to the market service or good disclosed herein. The second field is the market category 302 that specifies the market in which the good/services reside (e.g., transport, music, video, grocery/shopping, cleaning, moving, caregiving, etc.). The third field, service tags 303, represents a variable number of service tags. In one embodiment, some of the service tags 303 are common across categories. In one embodiment, some service tags are unique to that category. For instance, service tags include information such as whether a service is free or paid, the payment method, whether there is a data to be fetched from the LMS or not, etc. In contrast, music/video kinds or vehicle types can be unique to the music/video or transport categories. In one embodiment, publisher identifier (ID) 304 is the unique ID for the individual or entity that advertise the service. Service key 305 is a field used as a unique field to get additional data to present to the consumer. In one embodiment, in coordination with the service tags, service key 305 can be used as a unique key to request the additional data from LMS. In another typical use case, service key 305 is used as binary coded information that other LMA instances can decode and extract data. In one embodiment, the decoding and data extraction are performed using a dictionary or a more detailed template supplied when the LMA instance is installed or LMA instance subscribes for a service/good.

In one embodiment, publication manager 401 generates a publication response message 452 that specifies whether the request is granted or not, and if granted, provides the following information: one or more expressions to be published, lease time per expression (information indicating the amount of time for which the expression is published (e.g., expiration time)), type of each expression (e.g., primary or auxiliary), template of each expression, fields in the expression that can be overwritten or filled by the LMA instance, the pairing information between the primary and auxiliary expressions (e.g., which auxiliary expression can be used by which primary expression(s)), mode of auxiliary expressions (e.g., coupled or uncoupled). Publication manager 401 logs the request and generated response via data store handler 403.

LMA instance 410 generates subscription request message 453 as a response to the user input, which can be captured. The capture may be through various interfaces such as, for example, keyboard, microphone, camera, touch screen, wearable devices paired with the device and other sensors on the device. The user input can be any form of gesture or direct voice/text command. In one embodiment, LMA instance 410 also provides a set of forms that can be filled by the user. The user may fill out the forms using various input methods such as, for example, keyboard, voice, touch screen, etc. Once the user query is received, LMA instance 410 marshals the query into a format that can be parsed and processed by the LMS.

Communication channel 400 passes subscription request message 453 to subscription manager 402, which in return generates a subscription response message 454 to be relayed back to LMA instance 410 that sent the request. In one embodiment, subscription manager 402 resolves the query into a set of market categories and service tags based on the specific query and also using the subscriber profile, which can be extracted based on the usage history or filled by the user as user preferences. In one embodiment, subscription response memory 454 includes the following information if it is resolved successfully: one or more expressions to be subscribed to, lease time per expression, type of each expression (e.g., primary or auxiliary), detailed template of each expression, a mandatory bit mask per expression to identify the fields that are mandatory to match, matching value per expressions for the mandatory fields identified by the bit mask, the pairing information between the primary and auxiliary expressions (i.e., which auxiliary expression can be used by which primary expression), mode of auxiliary expressions (e.g., coupled or uncoupled), and if applicable additional dictionary data to decode opaque fields. In one embodiment, subscription requests 433 and the responses 454 are sent to data store handler 403 to maintain a transaction history. In one embodiment, subscription manager 402 also caches previous queries to return fast answers.

In one embodiment, LMA instances generate data upload messages 455 towards the LMS when publishers provide more detailed information for the services (e.g., contact information, pictures, videos, etc.). In one embodiment, LMA instances also generate data download messages 456 when they receive a matching expression for the first time with proper flags set in the expression or when they receive a data notification via the help of auxiliary expressions.

Data upload message 455 and data download messages 456 are received by communication channel module 400 of the LMS instance and handed to data store handler 403. Upon receiving a data upload message 455, data store handler 403 commits the uploaded data to the data store and returns an acknowledgement or error message. Upon receiving a data download message 455, data store handler 403 uses publisher ID 304 and service key 305 to extract the data for the matching expression from data store 420. Data store handler 403 responds back to LMA instance 410 with the expression data or an error code if no data is returned.

Auxiliary Expressions

In one embodiment, auxiliary expressions are used as data notification channels over LTE-D. In one embodiment, an expression manager that is part of a LMS assigns auxiliary expressions to different LMAs and they are unique within the scope of one LMA (i.e., on an LMA instance, each auxiliary expression is unique and is tied to a specific primary expression, while the same auxiliary and primary expressions can be used by different LMA instances for spatial reuse or other purposes). The expression manager maintains a pool of primary and auxiliary expressions to assign them to different LMAs for publishing their services. In one embodiment, the expression manager resizes the pools by migrating some expressions in one category to the other. In one embodiment, the expressions are assigned on a temporal basis and are renewed by the publishing LMAs for uninterrupted service broadcasting.

Different techniques for using auxiliary expressions for notifying data updates for a published service (and hence expression) are described below.

Use of Auxiliary Expressions as Notification Channels

In one embodiment, a dynamic set of auxiliary expressions are used as notification channels. In one embodiment, an expression manager assigns these auxiliary expressions on a per-demand basis to the market application instances on different user devices that dynamically update the data about goods and services published by the user devices. In one embodiment, an auxiliary expression is used in a coupled or uncoupled mode with the primary expressions used for service discovery.

Uncoupled Mode

In the uncoupled mode, the publisher uses the auxiliary expression as a standalone control channel. When the publisher (e.g., a user device) updates data associated with a primary expression, it publishes the auxiliary expression assigned to the primary expression to use LTE-D as a notification channel. The subscriber of the primary expression is subscribed to the auxiliary expression as well. Hence, after the publishing device starts broadcasting the auxiliary expression, the subscribing market applications of the user devices that are within the range receive a match from LTE-D. Upon receiving the match event to the auxiliary expression, the market application contacts a backend server to fetch the updated data. In one embodiment, corresponding the backend server may be the LMS or another server.

In one embodiment, after a short time out period, the user device transmitting the auxiliary expression unpublishes it (e.g., turns off the notification channel) and releases the auxiliary expression after a longer time out period. After release, in one embodiment, the auxiliary expression can be assigned to another primary expression by the expression manager. The state transition diagram for this operation at the publishing device is shown in FIGS. 4A and 4B according to one embodiment.

Figure 4A:
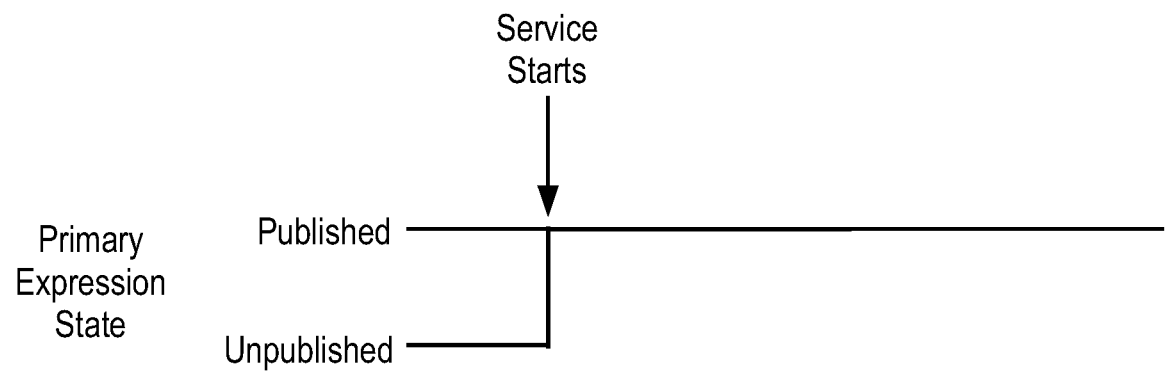
FIGS. 4A and 4B illustrate a state transition diagram for an operation at the publishing device according to one embodiment.
Figure 4B:
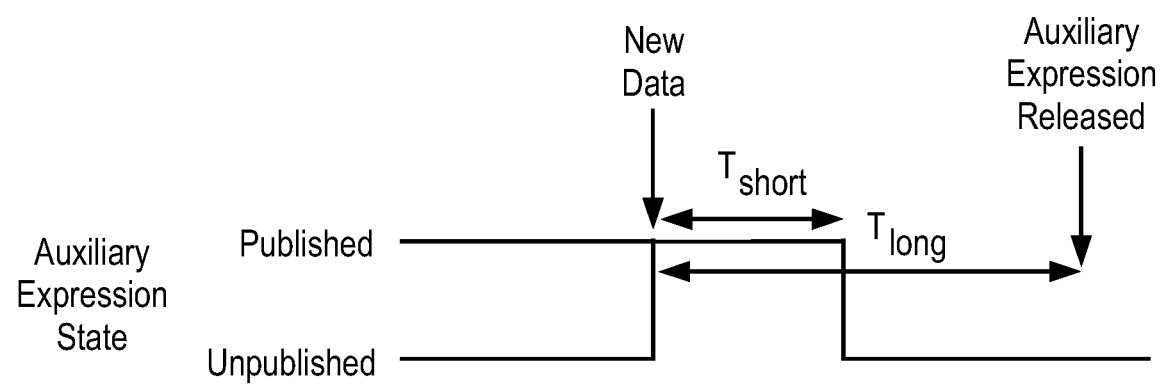

Referring to FIG. 4A, when a primary expression transitions for an unpublished state to a published state, the offer for service/good associated with the primary expression is started (via publication). Referring to FIG. 4B, when an auxiliary expression transitions from an unpublished state to a published state, new data associated with the service/good is available for access by subscribers. In one embodiment, after a short period of time, $T_{short}$, or a long period of time, $T_{long}$, the auxiliary expression is released to allow its use with another primary expression.

In one embodiment, a LTE-D receiver is set by the application in two modes when it subscribes to a service associated with an expression: continuous match or one-time match.

In one embodiment, if the continuous match is used, the LMA instance always subscribes to the auxiliary expression until its lease time expires. Therefore, the LTE-D layer/chip keeps listening to the auxiliary expression and notifying the LMA instance on the device each time the auxiliary expression is heard over the channel. The application stops receiving notifications once the auxiliary expression is unpublished. In one embodiment, the LMA instance sends a data download message 456 every time it receives a match event for the auxiliary expression.

If one-time match is used, the auxiliary expression (if published/broadcasted by another instance of LMA) is matched once and the application is then notified only once. In one embodiment, LTE-D chip of a user device keeps state information indicating that the same expression was matched previously and filters the subsequent match events for the same expression. This prevents multiple matches from occurring. The state is cleared when an unmatch event is registered by LTE-D receiver of the LTE-D chip or the expression is explicitly unsubscribed to by the local LMA instance. In one embodiment, an unmatch event is fired by LTE-D receiver if a previously matched expression is no longer received for a pre-configured number of discovery cycles (e.g., 2 or more).

In one embodiment, if data updates are very infrequent, the application can rely on receiving this unmatch event from the LTE-D chip in the next cycle, when the auxiliary expression is published again to notify the user device of a data update, a match event triggered by the LTE-D chip.

Figure 5:
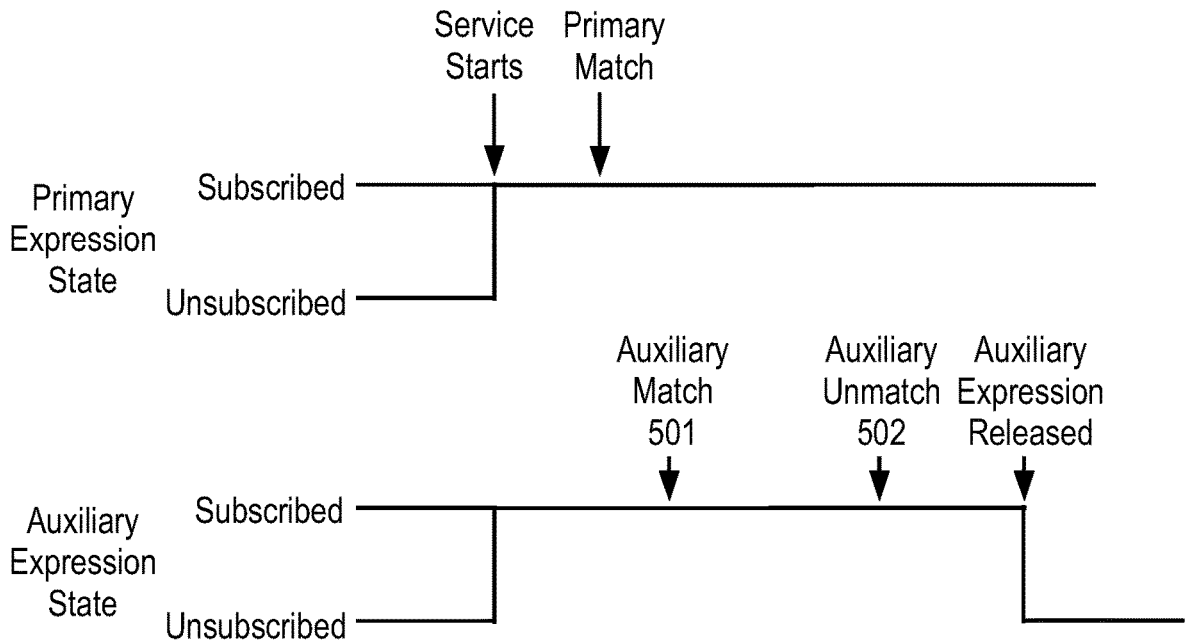
FIG. 5 illustrates a situation in which a LMA instance starts listening for the service when it subscribes to the primary expression.

FIG. 5 illustrates a situation, according to one embodiment, where the LMA instance starts listening for the service when it subscribes to the primary expression. As long as LMA instance is interested in the specific service/good, its state for the corresponding primary expression remains in the subscribed mode. At the same time or at a later time, the LMA instance can subscribe to the auxiliary expression assigned to the primary expression for data notifications. A match event 501 to the auxiliary expression triggers the LMA instance to generate a data download message to the LMS. Since one-time match is used, further match events on the auxiliary expressions are filtered by the LTE-D chip. In one embodiment, as the publisher stops publishing the auxiliary expression after $T_{short}$, after a few discovery cycles, LTE-D chip determines that either the publisher (user device) went out of range or stopped advertising the auxiliary expression and generate an unmatch event 502. When publisher starts broadcasting the auxiliary expression again (upon new data), a match event will occur again triggering another data download message.

If data updates are more frequent than the time required for generating an unmatch event, the LTE-D receiver misses the re-published auxiliary expression (in one-time match mode) as it will be filtered by the LTE-D chip. Thus, in one embodiment, to handle more frequent data updates, the LMA instance can unsubscribe from the auxiliary expression after a time-out period equal to or larger than the short time-out period used by the publisher as shown FIG. 6.

Figure 6:
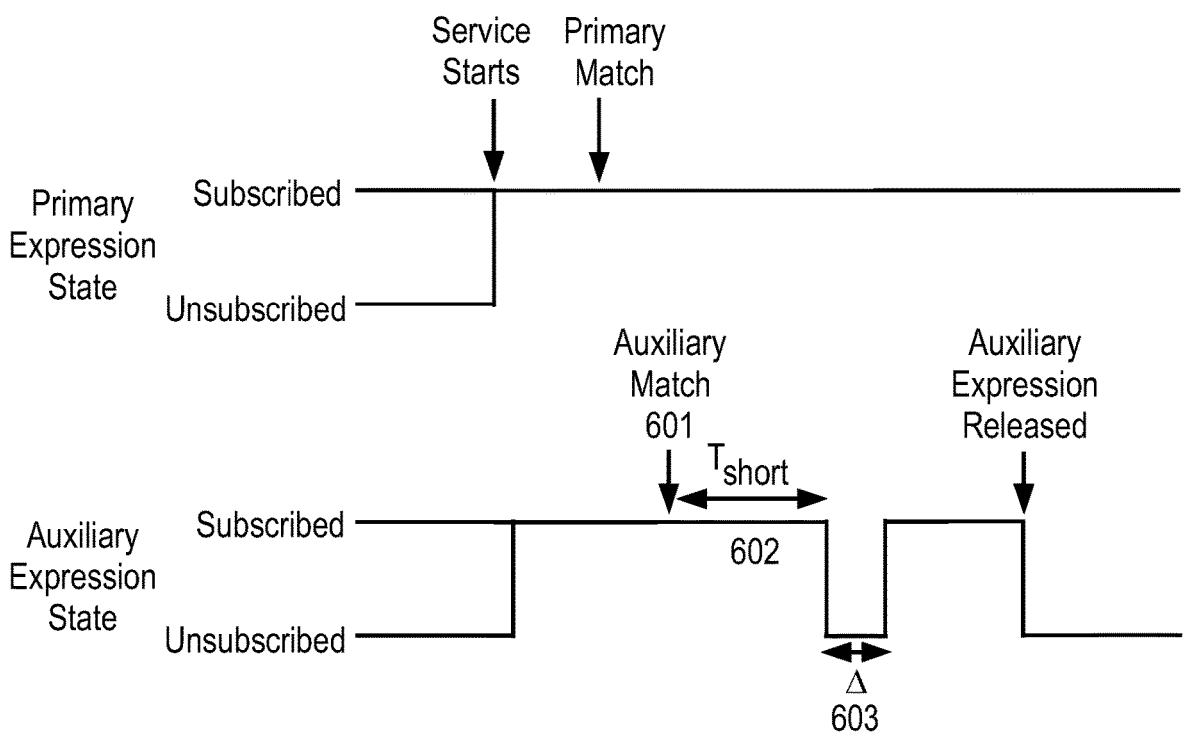
FIG. 6 illustrates an LMA instance unsubscribing from an auxiliary expression.

Referring to FIG. 6, the LMA subscribes to an auxiliary expression when the state transitions to a subscribed state. Thereafter, a match 601 of the auxiliary expression occurs. After a short time period, $T_{short}$ 602, expires, the LMA transitions to an unsubscribed state for a time period 602 that is shorter than $T_{short}$ 602. After this short time period 603, the LMA transitions to the subscribed state. In one embodiment, these time-out values are pre-configured in the LMAs to standard values. In another embodiment, these time-out values are set by the expression manager on the server side. The timer for the short time-out starts at the publisher side after the application publish command is sent to LTE-D chip and the LTE-D chip confirms it. In one embodiment, the timer for the short time-out starts at the subscriber side after the first time application is notified about the match event for the auxiliary expression.

After the lease time of any expression expires, the LMA instance unpublishes, or unsubscribes, to the published/subscribed expression.

Coupled Mode

In the coupled mode, primary and auxiliary expressions assume a toggled state (i.e., when the primary is published, the auxiliary is unpublished and when the auxiliary is published, the primary is unpublished). In this mode, the LTE-D receiver of the LTE-D chip subscribes to both expressions as in the uncoupled state, but as soon as it detects a match event for the primary (or auxiliary) expression, the LTE-D receiver swaps the role of the primary and auxiliary expressions.

Figure 7:
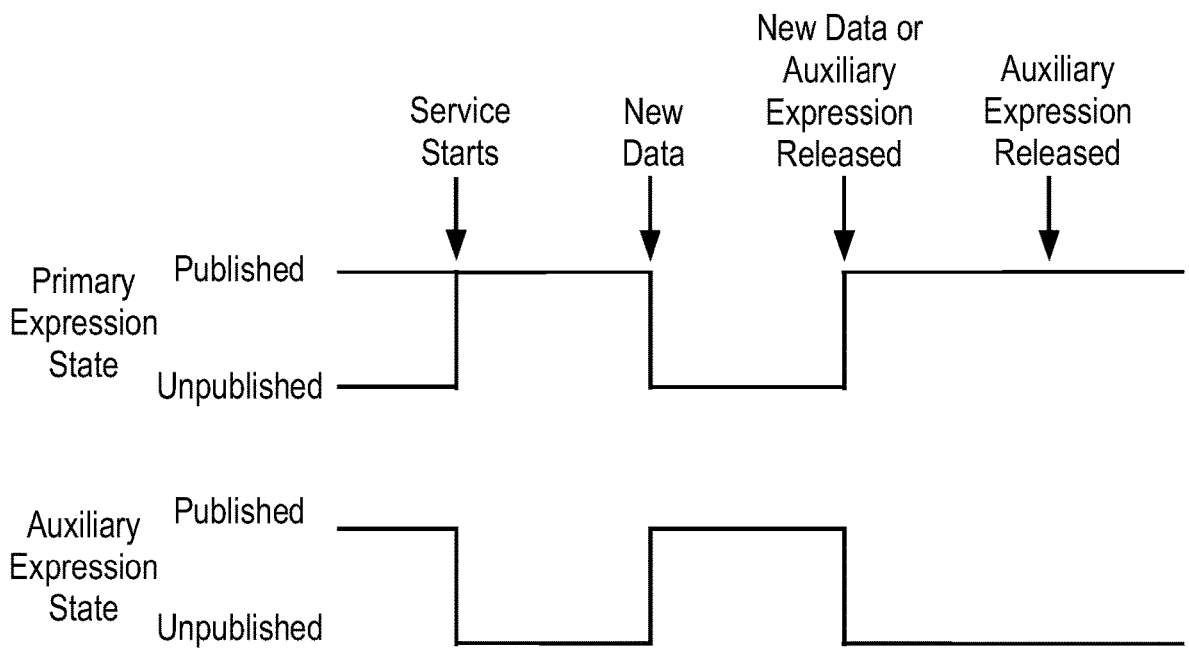
FIG. 7 is a state diagram of coupled primary and auxiliary expressions at the user device that is the publisher according to one embodiment.

FIG. 7 is a state diagram of coupled primary and auxiliary expressions at the user device that is the publisher according to one embodiment. Referring to FIG. 7, the toggled state between the paired expressions ends as soon as the auxiliary expression has an expired lease (and moves to an unpublished state). In this case, the data notification channel becomes unavailable and the LMA instance sets the state of the primary expression always in the subscribed mode, as otherwise no further service discovery would occur for the specific service that uses this primary expression.

Figure 8:
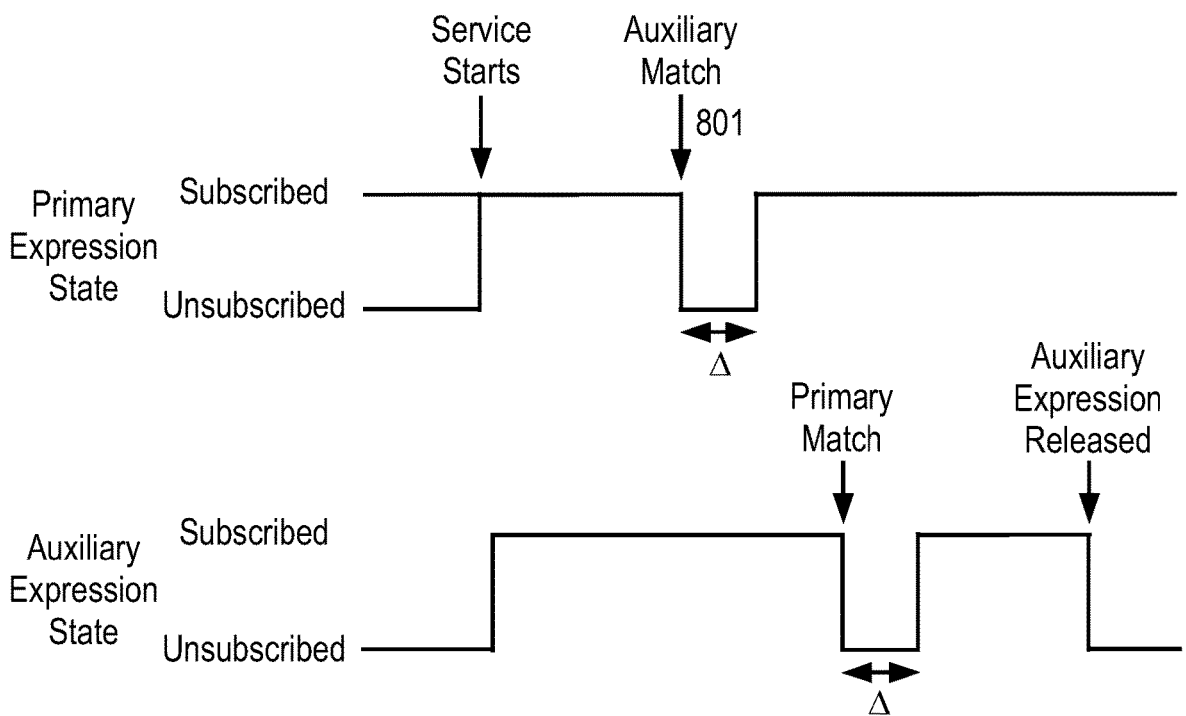
FIG. 8 illustrates a state diagram of a subscriber according to one embodiment.

FIG. 8 illustrates another state diagram of the state at a subscriber side according to one embodiment. Referring to FIG. 8, as a match event for the auxiliary expression indicates that the next data notification will be delivered by the primary expression, the subscribing LMA briefly unsubscribes and then re-subscribes to the primary expression (after the auxiliary match 801) to dispose of any state in LTE-D chip that can filter subsequent match event for the primary expression. Similarly, a match for the primary expression implies that the next data notification is delivered by the secondary expression. Thus, the LMA instance briefly unsubscribes and then immediately re-subscribes to the auxiliary expression to dispose of any state in LTE-D chip that can filter subsequent match event for the primary expression.

Limited Coverage Areas

In one embodiment, all the physical devices that can broadcast service discovery signals are pooled together to increase the range of coverage and the rate of discovery for proximity-based service discovery. This increases the coverage of service discovery and the rate of service discovery. In the current, proximity based services, the service point (wireless coverage area) should be close enough to the clients to have a successful service discovery and each service point must have dedicated physical devices. Embodiments of the invention make both limitations obsolete by extending the broadcasting range of a given service to every location that has at least one device capable of sending wireless expressions for service discovery.

In one embodiment, the extended coverage area is achieved by having the user devices (e.g., UEs) register their services with the marketplace platform and provide explicit information about the physical locations they want to cover (e.g., geo-fencing area) or information about their mobile subscribers (e.g., unique identities such as mobile subscriber identities known to a mobile network operator, subscriber locations). As described above, subscribers of proximity services can also directly provide the platform (e.g., through installed applications on their devices) with information as to what services they want to consume specifically or their general preferences. In return, the platform assigns expressions to individual services and decides which of the pooled physical devices should be broadcasting which one or ones of these expressions, their transmission powers and the amount of time for the transmissions. Thus, every mobile subscriber (e.g., user equipment) is capable of becoming a point of presence for proximity services, where the operator pushes service expressions to the subscriber devices on demand to broadcast the availability of various services. Operator can also use its own access points and base stations as part of the same infrastructure. Thus, embodiments of the invention can make an operator the single largest entity that owns a nationwide proximity-based service discovery platform with both indoors and outdoors coverage.

As more services come in, geo-fencing information varies, or user locations and preferences change, the platform can reconsider the beacon/expressions assignments to individual physical devices to make sure sufficient coverage is provided to all or some of the services.

By extending the coverage area, a particular set of users who are not within the immediate proximity of a particular service can be targeted. For instance, a user shopping in Shop A can receive advertisements about Shop B or vice versa without using any shop-specific devices, but using other user devices, which are capable of sending beacons/expressions.

Moreover, in one embodiment, a business owner or individual is not required to own a physical device to send expressions as these expressions can be broadcasted from any device in the pool. In one embodiment, multiple devices broadcast the same expression at different locations to increase the coverage of proximity-based service discovery.

Figure 9:
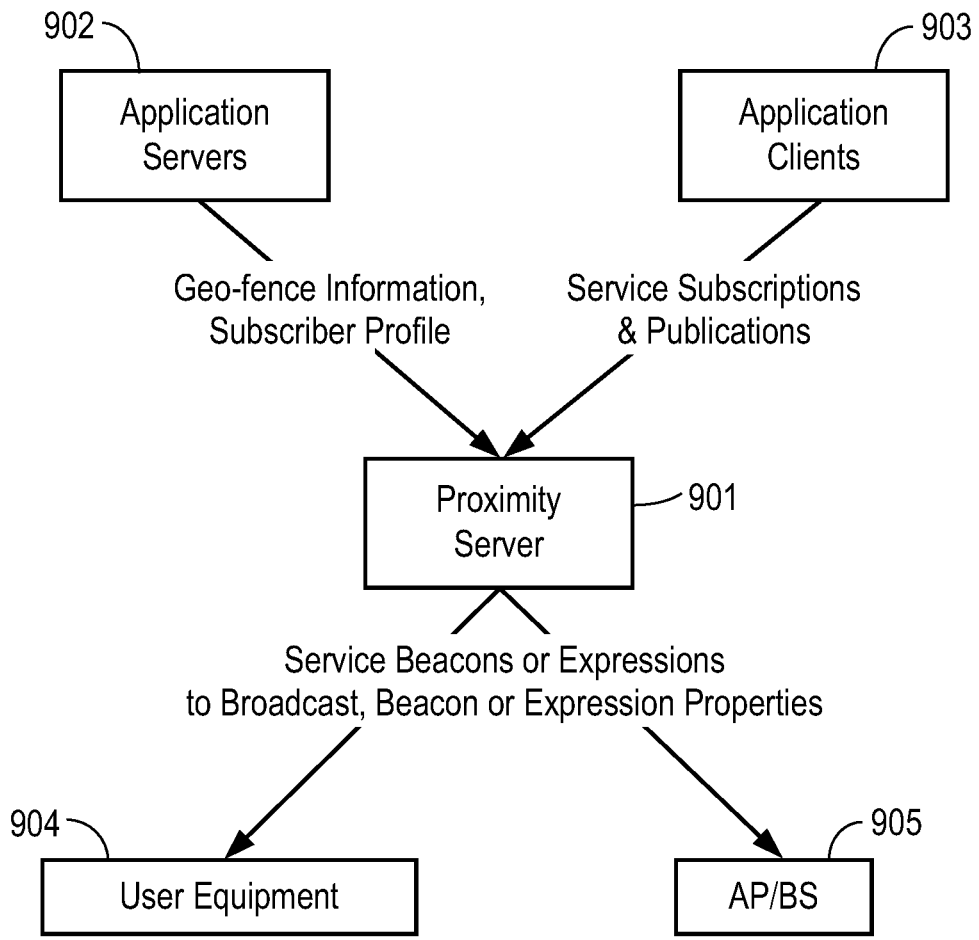
FIG. 9 is a block diagram of one embodiment of a platform that use additional information to better target offers for goods/services.

FIG. 9 is a block diagram of one embodiment of a platform that use additional information to better target offers for goods/services. Referring to FIG. 9, application servers 902 are typically hosted by services that utilize proximity based service discovery. Application servers 902 have information regarding the goods and services they are offering, their customer profiles, their transactions, what customers and locations they want to provide targeted services, etc. Application servers 902 provide geo-fence information (or other location information) and relevant subscriber profile information to proximity server 901. Geofence information can be in various forms such as, for example, one or more of a collection of 2D or 3D geometric areas (e.g., polygons and spheres) on a map with coordinate information of vertices and edges are precisely defined; a zip code or address; room number in a building; area numbers on a floor plan; etc. Other types of information related or relevant to the location information could be used as well. In one embodiment, subscriber information profile include a unique ID for each targeted user.

Application clients 903 (e.g., LMAs) run on subscriber devices and they either directly connect to proximity server 901 or indirectly as they issue subscription and publication requests to the service discovery functions residing in the operating system or the radio interface card, which in return connects to proximity server 901 to acquire the expressions to receive or transmit over the wireless interface. Proximity servers 901 thus acquire service subscription and publication information from application clients 903. Based on a subset of the information received from application servers 902, application clients 903 and possibly other databases that provide information about social networks of the subscribers, location and preference history, etc., proximity server 901 makes an allocation of service expressions to a pool of user and network devices to broadcast these expressions. In one embodiment, additional properties of each expression such as, for example, one or more of transmit power, lease time, frequency of broadcasting, etc. are also set by proximity server 901.

Note that there may be more than one proximity server, application server, access point/base station included in the platform.

Figure 10:
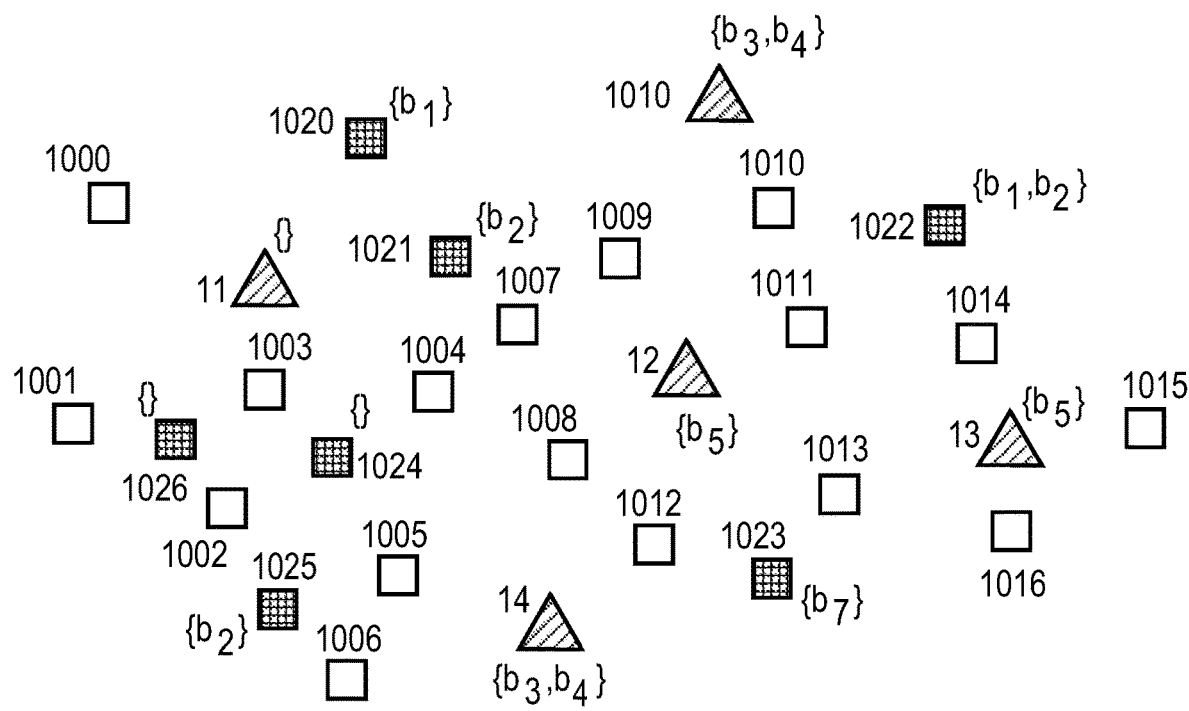
FIG. 10 shows one embodiment of a system on a 2D layout platform devices.

FIG. 10 shows one embodiment of a system on a 2D layout platform devices. In one embodiment, some mobile devices only run in proximity service receive (PSRX) only mode (e.g., devices numbered 1000 through 1016 in FIG. 10). These devices can subscribe and listen to the broadcasted service discovery signals over the wireless medium (e.g., service expressions), but they cannot be programmed by the proximity server to transmit proximity signals. PSRX devices that can broadcast proximity signals but are not under the control of a proximity server such as proximity server 901 are also put in this category. Some devices run in PSRX as well as proximity device transmit (PSTX) modes (i.e., PSRX/PSTX devices such as devices numbered 1010 through 1016 in FIGS. 11A and 11B). These devices can be controlled and programmed by the proximity server (e.g., proximity server 901) to transmit a specific set of service expressions as determined by the proximity server (e.g., proximity server 901).

In one embodiment, aside from utilizing the mobile devices of subscribers, the service discovery platform can also utilize fixed assets as part of the proximity service infrastructure. Regardless of whether these devices are standalone or integrated with existing hotspot access points or base stations, they are labeled as PSTX-only Access Points and PSRX/PSTX Access Points.

Figure 11B:
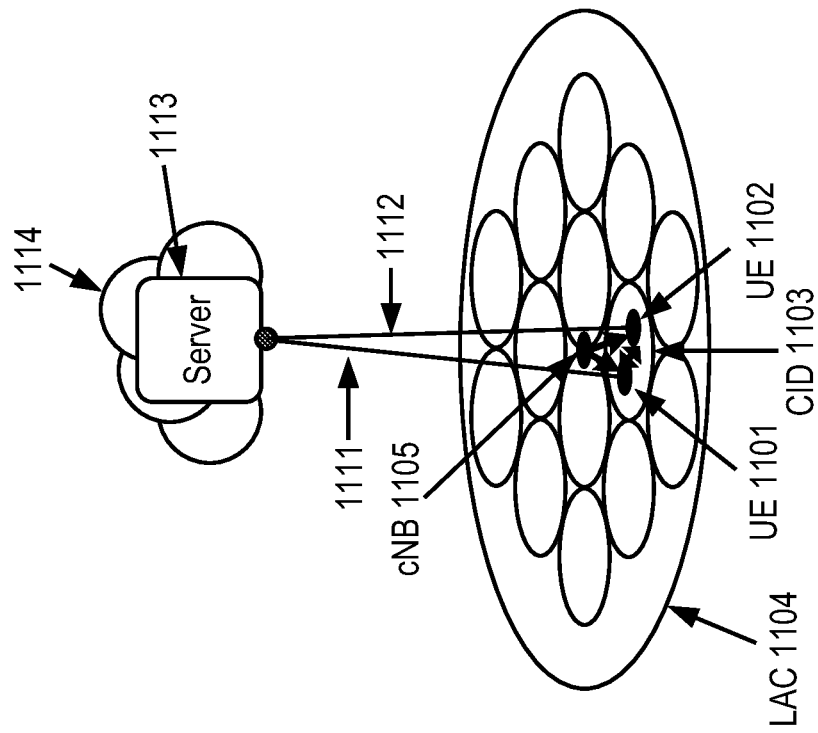
FIGS. 11A and 11B illustrate an example of expression assignment to access points and proximity signal transmission capable mobile devices.
Figure 11A:
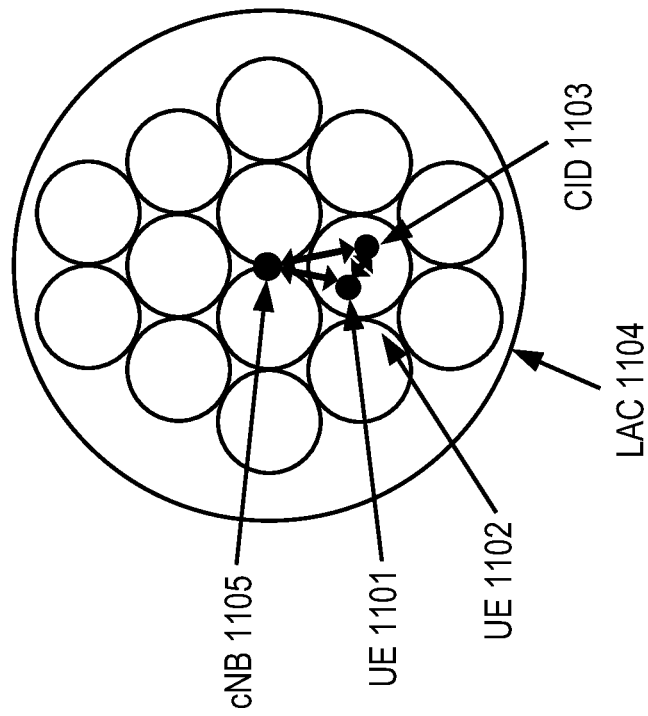

In FIGS. 11A and 11B, without loss of generality only PSRX/PSTX access points are shown. In the example, seven distinct expressions ($b_1$ through $b_7$) are assigned to various PSRX/PSTX mobile devices and access points. In one embodiment, the PSTX-only and PSRX/PSTX devices are assigned none, one or more service expressions depending on the coverage requirements of services published through the platform, the distribution of these programmable devices in space and time, the limits on individual devices (e.g., how many expressions they are subscribed to puts a limit on how many expression they can publish), the congestion (i.e., too many expressions transmitted in the same area), specifically targeted subscribers, and possibly other factors. In one embodiment, the assignment is dynamic as each expression has a limited lease-time, but also existing leases can be terminated or extended, or new beacons/expressions can be assigned. In FIGS. 11A and 11B, node 11, 1014 and 1016 have no assigned expressions, while some nodes have 1 (e.g., nodes 13 and 1010) and some others have 2 (e.g., nodes 10, 14, 1012) expression assignments. Some expressions (e.g., $b_2$) have more coverage than others (e.g., $b_7$).

A Service Delivery System Based on Spatiotemporal Mobile Network

LTE-D technology operates at the chip-set level. The application and mobile device has dependency on this chip-set. In one embodiment, to overcome this dependency, a cloud-based solution (e.g., software as a service (SaaS)) is used. This solution may be considered as a virtualization of LTE-D technology in the cloud.

In contrast to chip-set level technology, in one embodiment, a SaaS in the cloud handles device-to-device (D2D) communication to provide proximity base service discovery by using spatiotemporal mobile data at the software level. That is, in one embodiment, the broadcasting/multicasting service delivery is based on SaaS in the cloud (or other remote location) by using mainly spatiotemporal data of mobile networks (excluding global positioning system (GPS) data) for mobile devices (e.g., Android based phones).

When the mobile device needs to initialize D2D communication through the cloud system, it refers to data which is being generated by an integrated chipset, such as, for example, Subscriber Identification Module (SIM), where the SIM is providing international mobile subscriber identity (IMSI) with together dynamically generating Location Area Code (LAC) and Cell Id (CID). To identify a mobile device's location in the entire mobile networks, LAC and CID are used as a spatiotemporal data in mobile networks by telecommunication carriers. In one embodiment, a mobile service intent that is running as a daemon application refers to the spatiotemporal mobile network data, such as LAC and CID data. After LAC and CID is determined by the mobile daemon application, the data is used to create a "channel id" together with additional customizable data to provide device to device (D2D) communication by using broadcast/multicast messaging in the cloud.

In one embodiment, a notification channel provides D2D communication through the cloud that accompanies the goods and services being broadcasted. In one embodiment, the notification channel has dynamic data, such as described above, that is fetched to the consumer devices.

Embodiments of the invention have one or more positive impacts on proximity based services. Firstly, it reduces of the production costs of chip-set since a cloud-based application as software as a service (SaaS) promotes to mobile developers. Secondly, although the mobile devices that have old system architecture and chip-set will not adapt to LTE-D in the future, this hardware compatibility issue can be easily solved. Thirdly, the location and geo-fencing based applications sometimes violate user privileges since those applications may track and then store user's GPS coordinates.

In one embodiment, mobile network data (e.g., LAC, CID, and Signal Strength) is used instead of using GPS coordinate, high accuracy data like GPS data to determine the location of the user. The application uses those data to temporarily establish a cluster to provide D2D communication through the cloud. In addition, in one embodiment, messaging data has a time to live (TTL) is used by a user to automatically wipe out them from the cloud storage.

From a mobile developer's point of view, since one embodiment is a SaaS, the mobile developers can utilize this cloud-based system to create proximity services that are just-in-the-time in terms of mobile development. From a mobile user's point of view, mobile users can fetch any services from the cloud on-demand, and the proximity based services allow producers and consumers within walking distance of each other to locate each other and engage in a social, philanthropic or commercial activity. From a third party supplier's point of view, for example, embodiments of the invention allow for the creation of a market space for such a paradigm can combine virtual and physical services (e.g., shopping) into a better experience than having only one or the other.

FIGS. 11A and 11B illustrate a system hierarchy that provides for proximity-based server clocking using SaaS. FIG. 11B illustrates a top view, while FIG. 11B illustrates a perspective view. Referring to FIGS. 11A and 11B, the two UEs 1101 and 1102 are located under the same CID 1103 which is located under the same LAC 1104. There is one base station 1105 has two separated connectivity (for internet connection) with these two users which have a separated connection respectively, 1111 and 1112, with a remote server 1113 in the cloud 1114. Note that there are generally more than two UEs and base stations and may be more than one CID and LAC.

Figure 12:
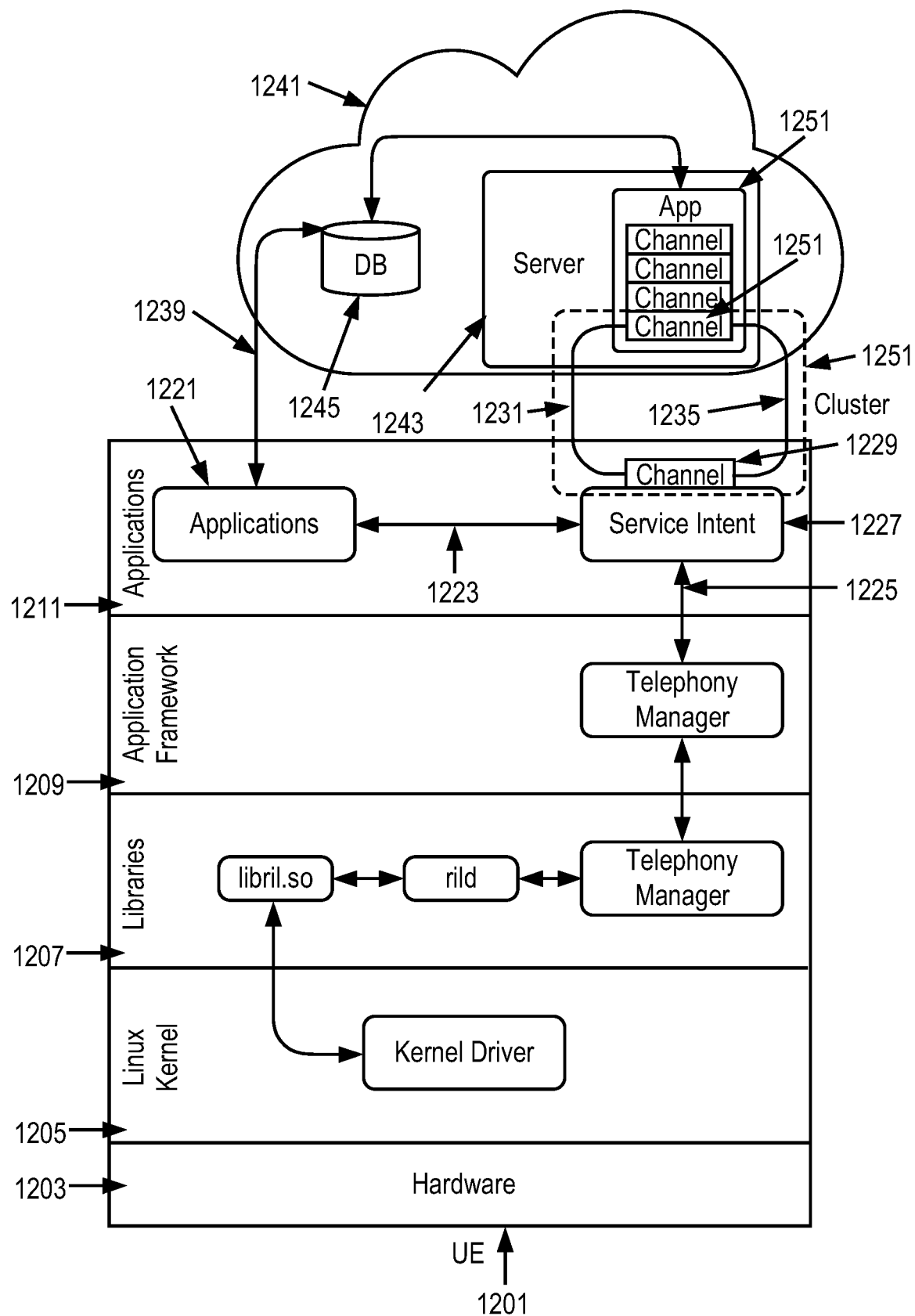
FIG. 12 illustrates one embodiment of an architecture of the proximity service discovery system.

FIG. 12 illustrates one embodiment of an architecture of the system. Referring to FIG. 12, the system includes an arbitrary UE 1201 has an Android OS has four system levels respectively; Linux kernel 1205, libraries 1207, application framework 1209, and application 1211. Application 1221 and service intent 1227 which comprises a part that runs on application 1211 level of Android OS. In one embodiment, those application agents have an indirect connectivity 1225 from the top (application) level through bottom (hardware) level, as well. The service intent is a daemon application that is running on background in the application level. In one embodiment the service intent has two communication channels 1223, 1231-1235) with the application and a remote server 1243 through a specific cluster 1237) and a channel (both 1229 and 1253 is same) in the cloud 1241. In the private or public cloud 1241, there is a server application 1251 is also running as daemon application to handle the client side's requests and demands. In one embodiment, server application 1251 has connectivity with a database 1245, such as, for example, key value storage (NoSQL) to save communication level messages and transactions in the cloud. Mobile application 1221 has a human interaction features can access to this data storage 1245 through a connection 1239 when it requires to write and read data.

Figures 13, 14:
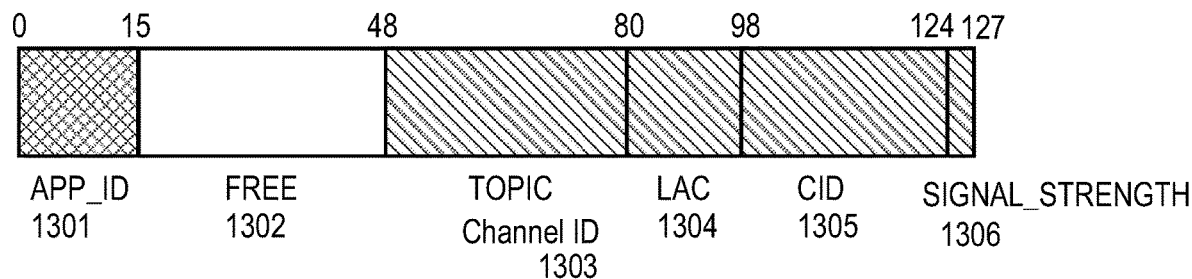
FIG. 13 illustrates one embodiment of a structure of a channel ID.
FIG. 14 illustrates one embodiment of a binary representation used to represent signal strength.

In one embodiment, to deliver an instant custom service (e.g., selling, offering, advertisement, news, etc.) as a broadcast message inside a specific network where a mobile user adverts it on demand, an unique "channel id" is generated in binary format (e.g., 128 bits like LTE-D) with respect to three kinds of data. FIG. 13 illustrates one embodiment of a structure of a channel ID. Referring to FIG. 13, the structure includes application ID 1301, free field 1302, topic 1303, LAC 1304, CID 1305, and signal_strength field 1306, and these are as follows: 1) Application (APP) ID 1301, which is represented with the first dedicated 16 bits by service's user(s) as a developer to identify the exact application are using which established channel(s) in the cloud; 2) additional customizable data is called as a Topic 1302, which is represented with 32 bits by users' demands (e.g., selling, offering, advertisement, news etc.); 3) mobile network data, which is being supplied by SIM, which comprise three fields of data, namely, LAC 1304 (16 bits), CID 1305 (28 bits) and SIGNAL STRENGTH 1306 (4 bits) as a qualitative data (e.g., excellent, good, fair, poor, no signal) in binary format.

FIG. 14 illustrates one embodiment of a binary representation used to represent signal strength. That is, the received signal strength indication (RSSI) level is represented in binary format.

Figure 15:
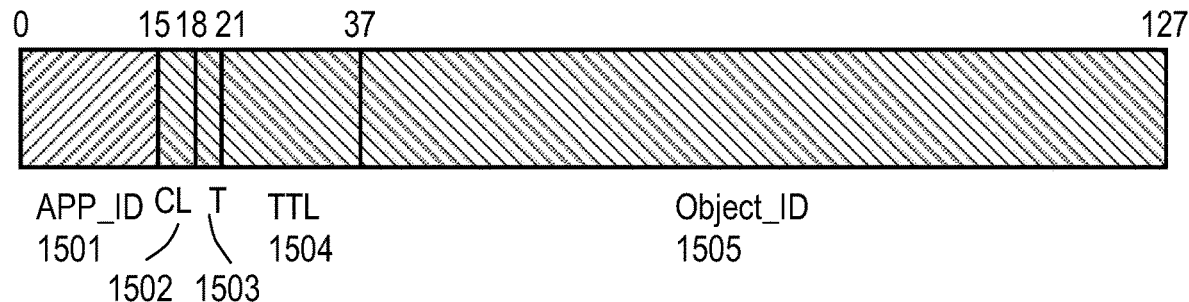
FIG. 15 illustrates a structure of one embodiment of the message format.

In one embodiment, the proximity-based service discovery process has three main flows. First, to initiate a "channel id", the spatial data is collected by the service intent application running as a daemon on the mobile devices. In one embodiment, the daemon service is checking out LAC and CID by specific time period. To establish a separated cluster in the cloud, a new "channel id" is created with respect to the gathered LAC and CID data. For instance, after a "channel id" is created in the cloud by a mobile device, mobile devices can connect to the channel by using same "channel id" if they are interested in same "Topic" located under the same LAC and CID. In other words, if the "channel id" exists as a cluster, the mobile device can join to the existed cluster instead of duplicating a channel. Second, to handle the mobile device's demand(s) and response to them through a specific cluster, the server side application is used. In one embodiment, this server side application runs as a daemon application that is a permanent member of every cluster that is initiated by different mobile device. In other words, even if at least one mobile device joins as a new member to the same channel by using the same "channel id", the mobile device establishes a cluster together with server side application. Note that in one embodiment, D2D communication is handled by separate clusters in the cloud, and not at the hardware level. Third, in order to send and receive messages through a cluster, a simple lightweight messaging structure is used. FIG. 15 illustrates a structure of one embodiment of the message format.

Figure 16:
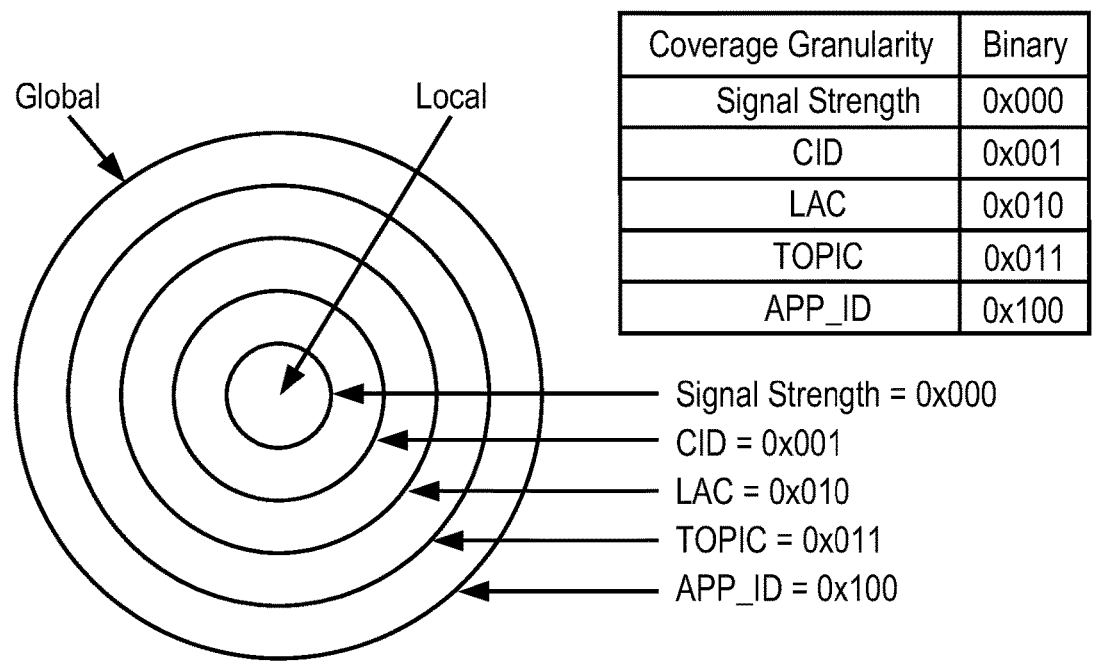
FIG. 16 illustrates one embodiment of the coverage level of a message.

Referring to FIG. 15, the message consists of five different fields are represented with 128 bits in binary respectively:
a. APP_ID 1501, which is the application id, is using to determine the application's type in the server side;
b. CL 1502 is a coverage level of that message that are being used to advert the message to the specific levels and its downward that is detailed in the coverage level of the message shown in FIG. 16. Referring to FIG. 16, in one embodiment, five coverage levels are defined as binary format with 3 bits in this architecture. The coverage level could be extendable up to eight levels. In the other words, the coverage level also can consider as coverage granularity, which is a parameter of broadcasting message in the specific coverage where a message will be adverted;
c. T 1503 is a unit of time, such as year, month, hour, minute, second, millisecond for "time to live". In one embodiment, to pick the unit of time, 3 bits are reserved for application.
d. TTL 1504 is time-to-live, which is a temporal time aspect. In one embodiment, the message was sent in the cluster that will be living in the cloud storage during its TTL. After its TTL expires, the message will be dropped over the database. Instead of using 64 bits to represent a timestamp in the body of message, in one embodiment, the two parts such as T 1503 (3 bits) and TTL 1504 (16 bits) are defined in this structure to reduce redundant binary (45 bits) usage;
e. Object ID 1505 is a kind of key on the key-value storage (cloud storage) where it is written by another UE. Before any of messaging is sent by any UE, the message context is stored on the cloud storage. Each transaction and data are stored with a unique key in the cloud. Any other UE can collect the specific data from the cloud storage by using that key after it received this key through a broadcasting message. Thus, this key is used as a reference of data in the cloud. In one embodiment, object ID 1505 is represented with 80 bits; in another embodiment, this key is extended up to 90 bits. Note that object ID 1505 may be other sizes.

Figure 17:
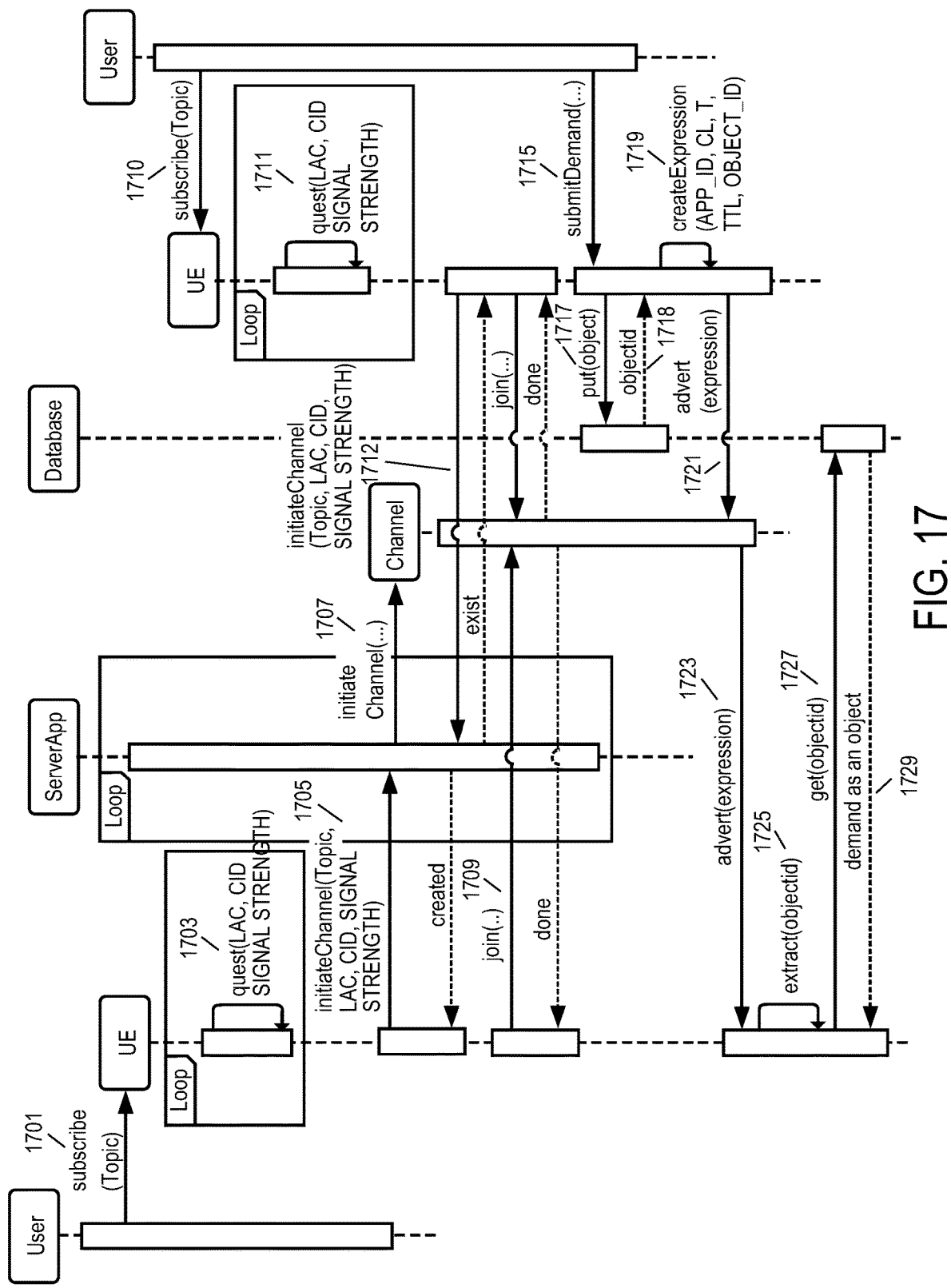
FIG. 17 illustrates a sequence diagram illustrating one embodiment of the proximity-based service discovery process for use in a spatiotemporal mobile network.

FIG. 17 illustrates a sequence diagram illustrating one embodiment of the proximity-based service discovery process for use in a spatiotemporal mobile network. Referring to FIG. 17, there are mainly two users, two UEs, a remote server, and data storage in the cloud. In one embodiment, each UE uses the same "channel id" and has a subscriber role as well as a publisher role. In a subscriber role, a UE initially creates a subscription request (1701 or 1710) with a topic through the application running on its UE. The service intent running as a daemon on the UE requests the spatiotemporal data by every specific time period over its UE as well (1703 or 1711). A channel initiation request (1705 or 1712) is created with its spatial data (e.g., in one embodiment, the data is LAC and CID) and a subscriber's topic that is submitted as a "channel id" to the remote server side in the cloud by the subscriber.

According to initiation channel request, either a new channel (1707) is initiated, or the subscriber side joins an initiated channel (1709 or 1713) by the other UE at an earlier time. In one embodiment, a publisher role, a request of submission demand (1715) is created through the application's user interface by a user.

After the UE creates an object with respect to user's demand, the object is written (1717) on the database in the cloud. In one embodiment, the database is working as a key-value storage and responds with an object ID (1718) related to the object that is submitted by the UE. Although the object ID is represented in string format, in one embodiment, it is converted in binary format (80-90 bits) to be propagated in the cluster through the channel. After this conversion, the expression (128 bits) is adverted (1721) across UEs through the channel in the same cluster. If any UE is a subscriber on the same channel, it receives (1723) the expression in binary format which is published by the other UE on the same cluster.

After the binary expression is encoded on the flight, the object ID is obtained (1725) to access (1727) to data with it on the database where it was written by message sender. Finally, the sender's demand (1729) is displayed as a graphical user interface on the receiver side of the screen.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for assigning service discovery signals, the method comprising:
   receiving a geo-fencing information and a subscriber information of a plurality of wireless devices;
   mapping each of one or more service discovery signals to one or more wireless devices in a group of wireless devices based on at least one of the geo-fencing information and the subscriber information, each of the one or more service discovery signals comprising a primary expression and an auxiliary expression assigned to the primary expression, wherein the auxiliary expression is used as a notification channel to update data associated with the primary expression.

2. The method defined in claim 1 further comprising receiving additional information that includes one or more of identity information, information indicative of temporal and spatial distribution of subscribers, information indicative of temporal and spatial distribution of the plurality of wireless devices; and
   wherein the mapping of each of one or more service discovery signals to one or more wireless devices in the group of wireless devices is based on the received information and the additional information.

3. A non-transitory computer readable storage medium that stores instructions, which when executed on a classification system, causes the system to perform a method for assigning service discovery signals comprising:
   receiving a geo-fencing information and a subscriber information of a plurality of wireless devices; and
   mapping each of one or more service discovery signals to one or more wireless devices in a group of wireless devices based on at least one of the geo-fencing information and the subscriber information, each of the one or more service discovery signals comprising a primary expression and an auxiliary expression assigned to the primary expression, wherein the auxiliary expression is used as a notification channel to update data associated with the primary expression.

4. The non-transitory computer readable storage medium defined in claim 3 wherein the method further comprises receiving additional information that includes one or more of identity information, information indicative of temporal and spatial distribution of subscribers, information indicative of temporal and spatial distribution of the plurality of wireless devices; and wherein the mapping of each of one or more service discovery signals to one or more wireless devices in the group of wireless devices is based on the received information and the additional information.

5. The method of claim 1, wherein the geo-fence information comprises one or more of area coordinates; a zip code, an address; a room number, an area identifier.

6. The method of claim 1, wherein the subscriber information comprises at least one of a subscriber identifier and a subscriber topic.

7. The method of claim 1, further comprising
   determining a channel based on at least one of the geo-fencing information and the subscriber information.

8. The method of claim 1, further comprising
   receiving a request associated with an object;
   determining an object identifier based on the request.

9. The method of claim 1, further comprising
   allocating service expressions to the one or more wireless devices.

10. The non-transitory computer readable storage medium of claim 3, wherein the geo-fence information comprises one or more of area coordinates; a zip code, an address; a room number, an area identifier.

11. The non-transitory computer readable storage medium of claim 3, wherein the subscriber information comprises at least one of a subscriber identifier and a subscriber topic.

12. The non-transitory computer readable storage medium of claim 3, wherein the method further comprises determining a channel identifier based on at least one of the geo-fencing information and subscriber information.

13. The non-transitory computer readable storage medium of claim 3, wherein the method further comprises receiving a request associated with an object; and determining an object identifier based on the request.

14. The non-transitory computer readable storage medium of claim 3, wherein the method further comprises allocating service expressions to the one or more wireless devices.

15. An apparatus comprising:
a memory; and
a processor coupled to the memory, wherein the processor is configured to receiving a geo-fencing information and a subscriber information of a plurality of wireless devices;
mapping each of one or more service discovery signals to one or more wireless devices in a group of wireless devices based on at least one of the geo-fencing information and the subscriber information, each of the one or more service discovery signals comprising a primary expression and an auxiliary expression assigned to the primary expression, wherein the auxiliary expression is used as a notification channel to update data associated with the primary expression.

16. The apparatus of claim 15, wherein the processor is configured to receive additional information that includes one or more of identity information, information indicative of temporal and spatial distribution of subscribers, information indicative of temporal and spatial distribution of the plurality of wireless devices; and wherein the processor is configured to map each of one or more service discovery signals to one or more wireless devices in the group of wireless devices based on the received information and the additional information.

17. The apparatus of claim 15, wherein the geo-fence information comprises one or more of area coordinates; a zip code, an address; a room number, an area identifier and wherein the subscriber information comprises at least one of a subscriber identifier and a subscriber topic.

18. The apparatus of claim 15, wherein the processor is configured to determine a channel based on at least one of the geo-fencing information and the subscriber information.

19. The apparatus of claim 15, wherein the processor is configured to
receive a request associated with an object; and wherein the processor is configured to determine an object identifier based on the request.

20. The apparatus of claim 15, wherein the processor is configured to allocate service expressions to the one or more wireless devices.

\* \* \* \* \*